US006957344B1

(12) United States Patent
Goldshlag et al.

(10) Patent No.: US 6,957,344 B1
(45) Date of Patent: Oct. 18, 2005

(54) MANUFACTURING TRUSTED DEVICES

(75) Inventors: David Moshe Goldshlag, Silver Spring, MD (US); David William Kravitz, Fairfax, VA (US)

(73) Assignee: Digital Video Express, L.P., Richmond, VA (US)

( * ) Notice: Subject to any disclaimer, the term of this patent is extended or adjusted under 35 U.S.C. 154(b) by 731 days.

(21) Appl. No.: 09/612,982

(22) Filed: Jul. 10, 2000

Related U.S. Application Data

(60) Provisional application No. 60/143,254, filed on Jul. 9, 1999.

(51) Int. Cl.[7] .............................................. G06F 11/30

(52) U.S. Cl. ...................... 713/194; 713/193; 713/156; 713/175; 713/201; 380/211; 380/278

(58) Field of Search .......................... 380/30, 286, 277, 380/279, 282, 255, 247, 201, 278, 211; 713/201, 713/200, 156, 155, 175, 171, 211, 193, 194; 705/76, 44, 57

(56) References Cited

U.S. PATENT DOCUMENTS

| | | | | |
|---|---|---|---|---|
| 5,825,880 | A * | 10/1998 | Sudia et al. | 713/180 |
| 6,085,323 | A * | 7/2000 | Shimizu et al. | 713/201 |
| 6,094,721 | A * | 7/2000 | Eldridge et al. | 713/168 |
| 6,233,685 | B1 * | 5/2001 | Smith et al. | 713/194 |
| 6,398,245 | B1 * | 6/2002 | Gruse et al. | 280/228 |
| 6,418,421 | B1 * | 7/2002 | Hurtado et al. | 705/54 |
| 6,438,235 | B2 * | 8/2002 | Sims, III | 380/285 |
| 6,615,347 | B1 * | 9/2003 | de Silva et al. | 713/156 |

* cited by examiner

*Primary Examiner*—Gregory Morse
*Assistant Examiner*—Tongoc Tran
(74) *Attorney, Agent, or Firm*—David G Grossman

(57) ABSTRACT

The present invention discloses a method and apparatus for manufacturing trusted devices. A licensing authority provides keying information to a multitude of manufactures that insert the keying information into trusted devices. The trusted devices generate final private and public keys using the keying information. The keys may then be certified by the manufacture and verified by other devices.

12 Claims, 4 Drawing Sheets

MANUFACTURING TRUSTED DEVICES

CROSS-REFERENCE TO RELATED APPLICATION

The present application claims the benefit of provisional patent application Ser. No. 60/143,254 to Goldschlag, et al., filed on Jul. 9, 1999, entitled "Manufacturing Trusted Devices without Trust or Certification of Licensed Devices with Limited Manufacturer Liability", which is hereby incorporated by reference.

TECHNICAL FIELD

This invention relates generally to the field of keying licensed devices, and more particularly to mechanisms for a licenser to license individual boxes without exposing private keys to a manufacturer.

BACKGROUND ART

Many consumer appliances are beginning to be manufactured with cryptographic keys. For example, consumer electronics equipment like CD players and Digital TVs may communicate over digital interfaces such as IEEE 1394; data moving over that interface may be cryptographically protected to prevent unauthorized copying. The protocols used across those interfaces typically require the negotiation of a bi-directionally authenticated shared secret between devices. Logical mechanisms are needed for individually keying devices; specifically, providing licensed devices with verifiable public keys.

Often, only a single licensing authority exists that licenses the manufacture of compliant devices (henceforth called set-top boxes, STBs). The license may constrain the behavior of STBs: for example, enforce copy protection rules, or limit interoperability. The licenser may desire to have unit-by-unit control over compliant devices, in order to limit the impact of counterfeit devices. For example, if each STB has its own keys, a pirate manufacturing counterfeit devices may have to sacrifice a compliant STB for each counterfeit unit. Also, a manufacturer should be unable to produce more STBs than it is licensed to. Manufacturers should also be unable to transfer authorization to build units without the consent of the licenser.

Manufacturers, however, may not want the responsibility of protecting the keys in their devices, and may also wish to limit the communication required between them and the licensing authority.

What is needed is a protocol for keying devices that allows unit-by-unit licensing, requires only the ability to transfer (in batch) information from a licenser to a manufacturer, while providing the manufacturer with the ability to not know the private key installed in each STB. For example, if STB private keys are generated internally to each STB, the manufacturer may never need to transport those private keys. How a private key is generated and stored securely in each STB could be a design robustness constraint imposed by the licenser.

Certification Authorities (CA), whether online or offline, serve to place trust in public keys and restrictions on their authorized use. There is a need for a keying process that produces keys that CAs may certify.

Sterilization is another keying process with different objectives and steps. Once sterilized, public keys may be guaranteed to have certain properties, even though the initial private and public keys were generated by a registrant. For example, the registrant may generate a Diffie-Hellman type private and public key pair, with the intent of using those keys to learn bits of the private keys of peers. If the certification authority sterilizes the public key, the certification authority may ensure that the resulting key will not enable that compromise.

Notice that in sterilization, the modification of the key may done by the certification authority after the registrant produces his private/public key pair. Also needed is a process where the authority preferably produces seed material that the registrant may use to produce a final private/public key pair such that the authority may then verify compliance when presented with the final public key.

DISCLOSURE OF THE INVENTION

One advantage of the invention is that it provides a registration and certification infrastructure that may enable the authentication of individual STBs and may enable clone detection.

Another advantage of this invention is that it may confirm that each STB was built with the consent of the licenser, without unnecessarily exposing STB secrets.

Yet a further advantage of this invention is that it provides for clone detection, unit- by-unit licensing, manufacturer accountability over licensed units, and limited manufacturer and licenser responsibility for STB secrets.

Yet a further advantage of this invention is that it provides a process where an authority may produce seed material that a registrant may use to produce a final private/public key pair such that the authority may then verify compliance when presented with the final public key.

Yet a further advantage of this invention is that it provides a protocol for keying devices that allows unit-by-unit licensing, requires only the ability to transfer (in batch) information from a licenser to a manufacturer, while providing the manufacturer with the ability to not know the private key installed in each STB.

To achieve the foregoing and other advantages, in accordance with all of the invention as embodied and broadly described herein, a method for manufacturing a trusted device comprising the steps of: receiving keying information from a manufacturer, the manufacturer having received the keying information from a licensing authority; generating a temporary private key; computing a final private key using the temporary private key and the keying information; computing a final public key using the temporary private key and the keying information; sending the final public key to the manufacturer for certification; receiving a binding certificate from the manufacturer.

In yet a further aspect of the invention, a method for manufacturing a trusted device further including the steps of computing an evidentiary certificate, presenting a copy of the evidentiary certificate to a second device, and the second device verifying the evidentiary certificate.

In yet a further aspect of the invention, a method for manufacturing a trusted device further including the steps of: the second device requesting a credential confirmation from the trusted device; the trusted device computing a credential confirmation; and the trusted device presenting a copy of the credential certificate to the second device.

In yet a further aspect of the invention, an apparatus for manufacturing trusted devices comprising: a licensing authority for providing keying information; a multitude of manufactures, each of the manufactures receiving keying information from the licensing authority; and a multitude of trusted devices, each of the trusted devices receiving keying information from one of the multitude of manufacturers and generating a final private trusted device key and final public trusted device key using the keying information; wherein the manufacture certifies the public trusted device key.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention.

BEST MODE FOR PRACTICING THE INVENTION

Figure 1:
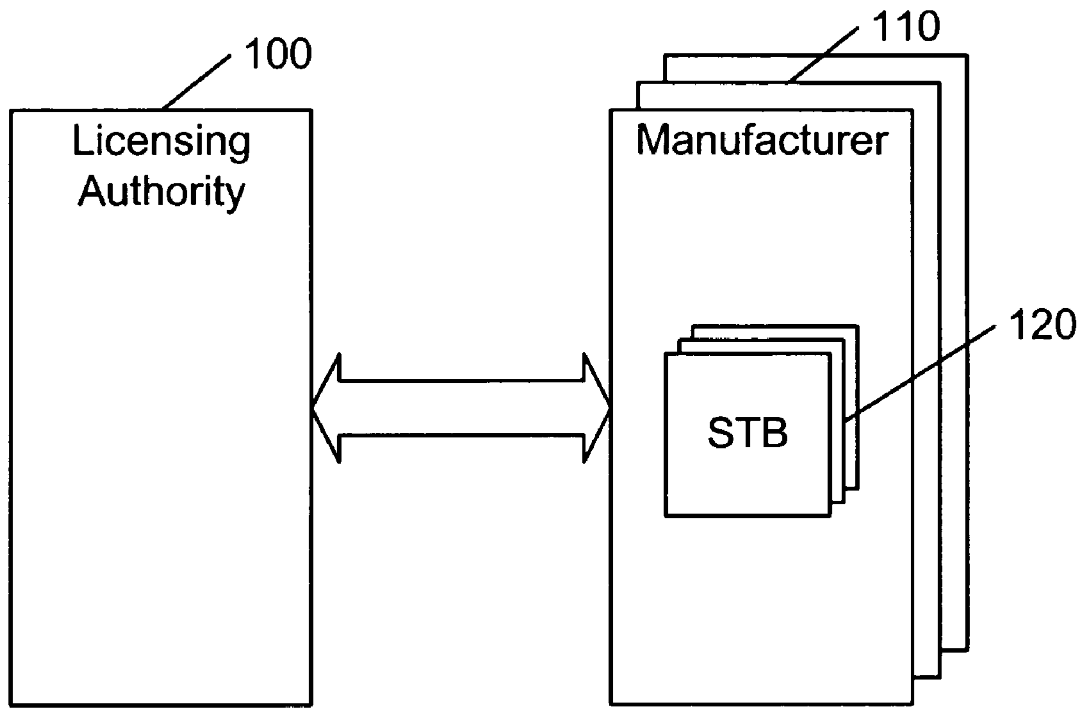
FIG. 1 is a block diagram showing a license authority and a multitude of STB manufactures as per an embodiment of the present invention.
Figure 2:
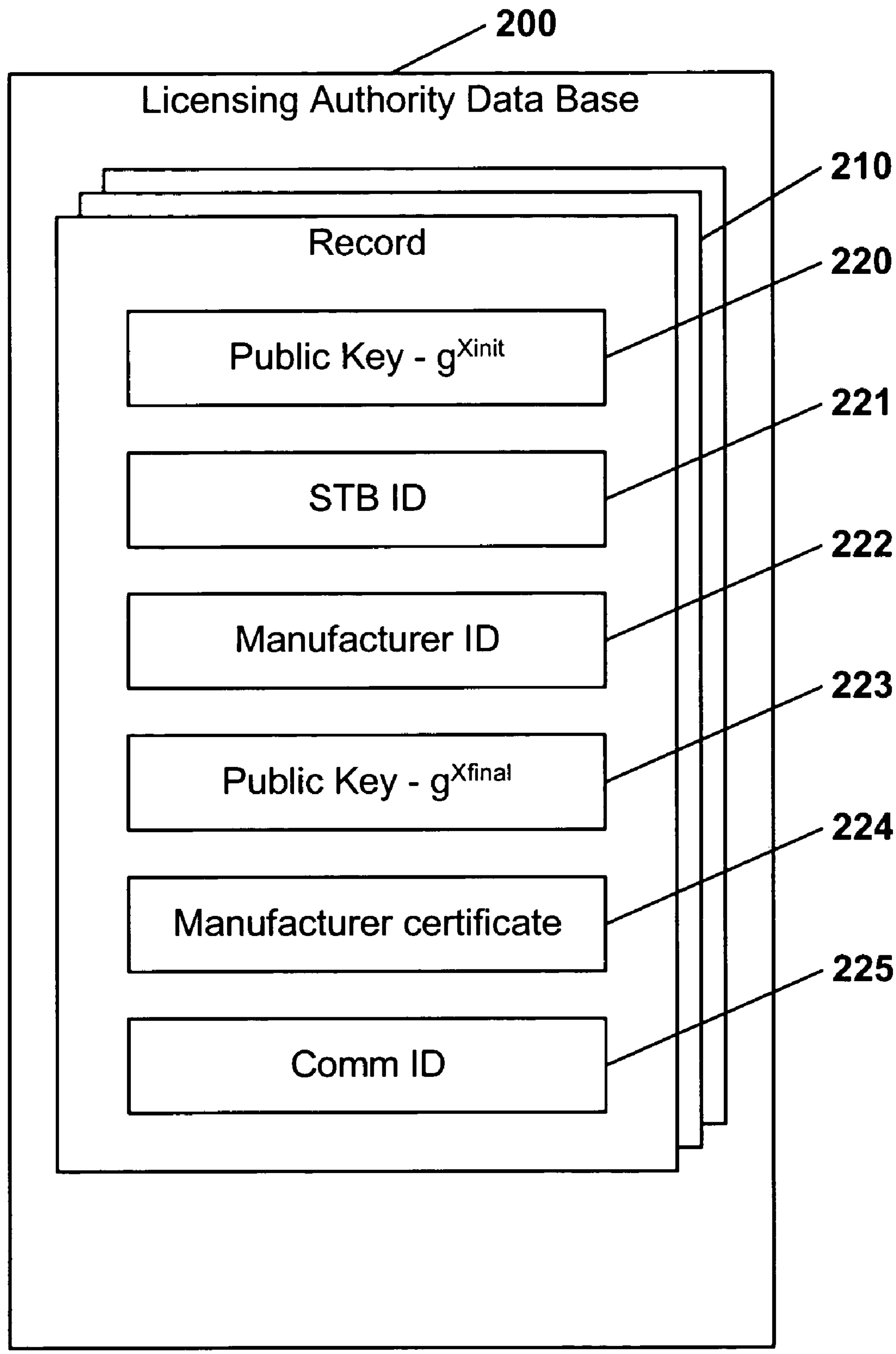
FIG. 2 is a block diagram of a licensing authority database as per an embodiment of the present invention.
Figure 3:
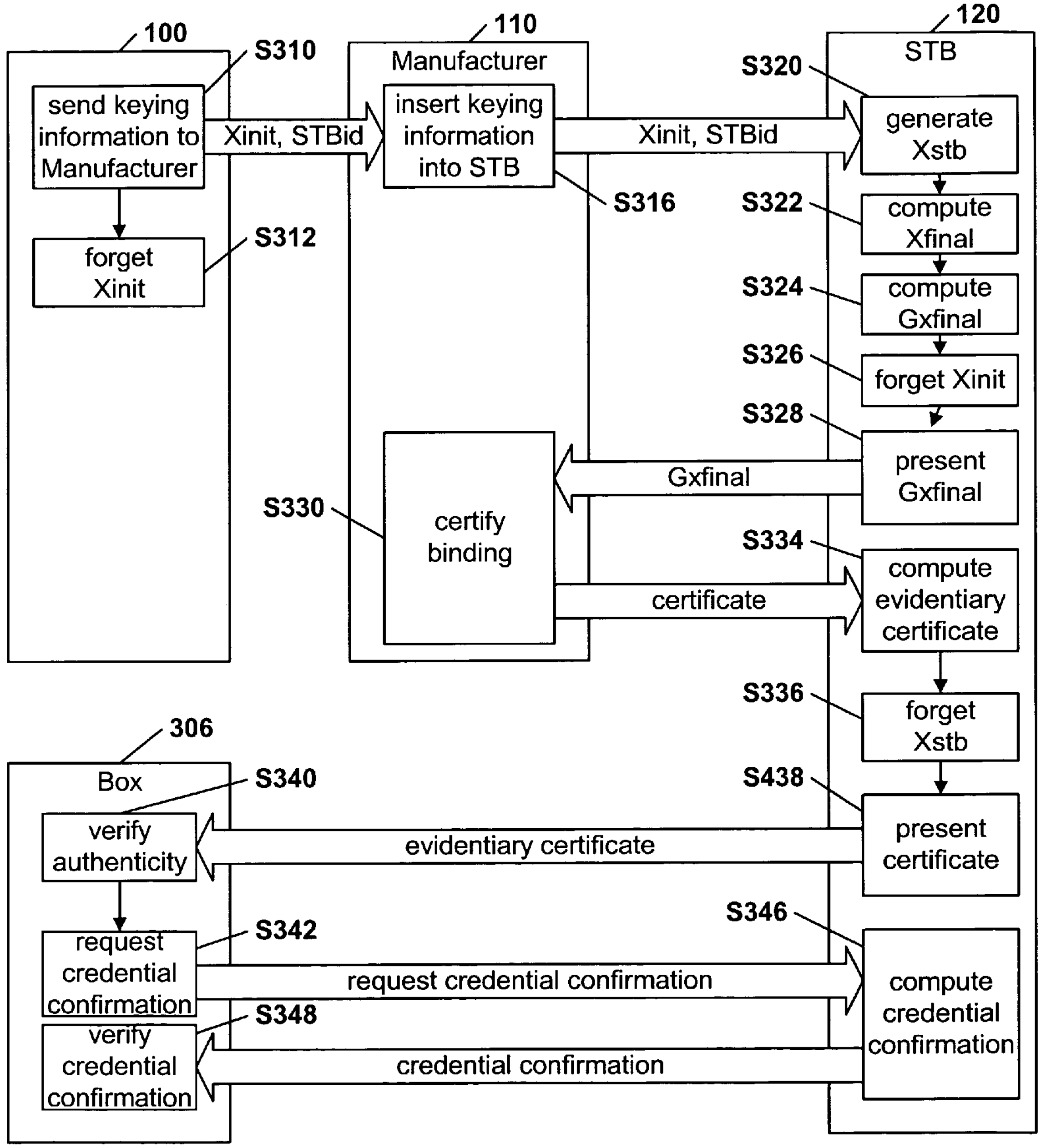
FIG. 3 is a block diagram illustrating the production of STBs database as per an aspect of an embodiment of the present invention.

The present invention provides a registration and certification infrastructure that may enable the authentication of individual STBs and may enable clone detection. The present invention may also be able to confirm that each STB was built with the consent of the licenser, without unnecessarily exposing STB secrets. Therefore, the present invention preferably provides for clone detection, unit-by-unit licensing, manufacturer accountability over licensed units, and limited manufacturer and licenser responsibility for STB secrets. The STB may not need to have a good random number generator, in that the invention may make productive use of such randomness while ensuring that an acceptable level of security is preserved even if such randomness cannot be relied upon for strength.

Although there may only be a single licensing authority, there may be many licensed competing STB manufacturers, and customers interconnected STBs providing different services, all of whom may have no reason to trust one another. For example, connecting STBs should not compromise the STBs or introduce trust dependencies between those services.

A clone device may be either an exact copy of a manufactured STB or one built from the keying material the licenser gave the manufacturer for that device.

Unit-by-unit licensing may require that the licenser produce and distribute the STB secrets. Limited manufacturer and licenser responsibility for these secrets may require that the secrets placed in the box not be valid forever in the sense that knowledge of these secrets may not be sufficient to compromise compliant boxes. Eliminating trust dependencies between service providers may require that service providers not know STB keys, and therefore that public-key cryptography be used.

The Diffie-Hellman operations in this disclosure are written using exponentiation without further specification. This is not meant to preclude the use of elliptic curve cryptography. In a particular implementation it may be that not all of the suggested procedures outlined here will be adhered to.

Effective unit-by-unit licensing may require that the licenser be able to track abuse by a manufacturer in terms of reuse of STB secrets. If compliant STBs are built so that they randomly modify the original STB secret key internally to the STB, clone devices that are exact copies, while producible by pirates, are not likely to come directly off of the manufacturing line. If the manufacturer certifies multiple STBs which use the same licenser- issued STB secret but generate different final public keys, the manufacturer may bear responsibility for the act of licensing infringement. If the manufacturer's certification private key is compromised, pirated STBs keyed without knowledge of legitimate STB secrets may ultimately be detected as counterfeit. The use of public-key vs. symmetric-key cryptography may allow STBs to conduct verifiable communications without compromising the identities or secrets of individual STBs.

Reference is now made to the figures in disclosing embodiments of the present invention. In the Certification Process, licenser (L) 100 may have a private key $X_1$ and may distribute associated public key $g^{X1}$. L 100 has a database 200 with records 210 for each licensed STB 120. The records 210 include $g^{Xinit}$ 220, STBid (set-top box ID) 221, and a manufacturer ID 222 (the latter two are optional), where the licenser L 100 may be responsible for the (random) generation of the values of $X_{init}$. Each record may also have fields for $g^{Xfinal}$ 223 and the manufacturer's certificate 224, and (optionally) a field for the ID of a device or entity with which the STB communicates 225. The fields $g^{Xfinal}$ 223, the manufacturer's certificate 224, and STB comm ID 225 may be obtained from the STB 120 some time following manufacture and certification. There may be one or more manufacturers (M) 110 who may certify public keys for STBs 120 they manufacture.

Each licensed device may be referred to as STB 120, while (allowably peer) devices with which a STB may communicate may be referred to as BOX 306. In this context, as an example, the STB may actually be a cryptographic token and the STB 120 may be a smartcard or conditional access module, i.e., there is no specification with respect to form or additional functionality.

Communication may begin with the licenser 100 sending STB keying information to the manufacturer 110 at step S310. The STB keying information transported to the manufacturer includes $X_{init}$ and STBid (encrypted for confidentiality, and authenticated collectively to protect against interception and diversion). Once sent, the licenser 100 preferably forgets the private Xinit at step S312. Therefore, viewing the licenser's database may not enable the unauthorized keying of STBs 120.

Next, at step S316, the manufacturer 110 may insert the keying information into the STB 120 following its own, potentially auditable, security procedures which may make use of encrypted communications). The STB may then generate a temporary private key $X_{stb}$ at step S320 and compute a final private key $X_{final}=(X_{init}+X_{stb})$ at step S322. The STB 120 may also compute its final public key $g^{Xfinal}=g^{(Xinit+Xstb)}$, and sends it to the manufacturer for certification at step S324. The STB 120 then preferably forgets the private $X_{init}$ (although it is derivable from $X_{final}$ and $X_{stb}$) at step S326.

The manufacturer may then certify the binding between $g^{X_{final}}$ and STBid (or certifies $g^{X_{final}}$ alone if no STBid is provided within the system), and gives that certificate to the STB (where the certificate includes the signature on the text as well as the text itself) at step S330. The certificate may have the form $Sign_M(g^{Xfina1}, STBid)$. Observe that neither the manufacturer 110 nor the licenser 100 may now know the STB's private key although it may be linked to $X_{init}$. Even so, the manufacturer 110 preferably does not retain $X_{init}$, in order to preclude the keying of unauthorized STBs.

The manufacturer's signature may provide a portable means for a STB 120 to indicate to a BOX 306 that its purported public key has legitimately been registered into the system in a way which may be verified without on-line connectivity. The non-repudiable aspect of the manufacturer's signature may allow the licenser to detect and prove to a disinterested third party the manufacturer's fraudulent complicity in the generation of non-identical clones.

The STB 120 may compute $(g^{X1})^{Xstb}=g^{X1*Xstb}$ using the licenser's 100 public key $g^{X1}$ and its temporary private key $X_{stb}$. The STB 120 may calculate and retain an evidentiary certificate hash($g^{X1*Xstb}$), $g^{Xstb}$ at step S334. Xstb may then be forgotten at step S336. The evidentiary certificate may be presented to a BOX 306 later. Note that the evidentiary certificate may not a certificate in the sense of including a non-repudiable digital signature.

The STB may be interconnected to other devices such as box 306. The STB may send the evidentiary certificate $Sign_M(g^{Xfinal}, STBid)$, hash($g^{X1*Xstb}$) $g^{Xstb}$ to the box 306 at step S338. The BOX may then verify the authenticity of the public key $g^{Xfinal}$, if it trusts the manufacturer's signature key at step S340. The BOX 306 may then require the STB to do a credential confirmation (akin to key confirmation), to confirm that it knows $X_{final}$, in order to thwart nuisance spoofing. The BOX 306 may request that the STB 120 confirm that the STB 120 knows the private key corresponding to the presented public key at step S342. This may prevent nuisance spoofing, a denial-of-service attack where an attacker presents credentials derived from another STB's credentials for the purpose of making what appears to be a cloned STB 120, and thereby causing the system to deauthorize all apparent clones. Such nuisance devices may be detected, however, because they may not negotiate the long-term secret with the BOX 306. So the STB 120 may confirm knowledge of the private key, by sending a hash of the last 256 bits of the DH key negotiation to the BOX 306 at step S346. This may be done by having the STB 120 provide to the BOX 306 proof of knowledge of a shared secret based on $X_{final}$, perhaps via Diffie-Hellman where the STB's 120 public contribution is $g^{Xfinal}$. The BOX's 306 Diffie-HellInan component may be fixed and unauthenticated provided that it is (probabilistically) distinct from that of other BOXs.

Although one might think it is counter-intuitive to use the STB-generated $g^{Xstb}$ rather than the original licenser-provided $g^{Xinit}$ in the proof, as demonstrated in the analysis section the use of $g^{Xinit}$ would allow for successful replay by an adversary.

The licenser 100 may want to verify the credentials of the STB 120. At this stage, the licenser 100 may not know the final public key of the STB 120. The licenser 100 may authorize this public key if the information (including the evidentiary certificate) is passed to it. The licenser 100 preferably verifies the authenticity of the STB 120 to confirm that the STB's key was constructed from the keying material the licenser 100 gave the manufacturer 110 at step S348. This verification may take two steps. In the first step, the licenser may recompute $g^{Xfinal}=(g^{Xinit}g^{Xstb})$ using $g^{Xinit}$ from its database, and $g^{Xstb}$ from the evidentiary certificate. In the second step, the licenser 100 may then check that the recomputed value of $g^{Xfinal}$ matches that in the manufacturer's 110 (verifiable) certificate, and (optionally) that this manufacturer 110 was the one originally associated with the particular $X^{init}$. The licenser 100 may then compute a hash($(g^{Xstb})^{X1}$), and then check it against the received value.

Successfully verifying these two steps may prove that if the STB 120 knew $X_{final}$ then it knew $X_{stb}$ and $X_{init}$. The credential confirmation step S348, executed by the STB 120 with the BOX 306, may prove to the BOX 306 that the STB 120 is aware of the value of $X_{final}$. The two proofs may combine to exhibit proof of protocol adherence. By having the STB 120 perform the credential confirmation step S346 with the entity with which it communicates directly, namely the BOX 306, we may thwart an attack in which another STB 120 would attempt to reuse the intercepted credential confirmation with another BOX 306. Consequently, the authentication of knowledge of $X_{stb}$ may be performed indirectly with the licenser 100 because its reuse by a STB 120 which lacks knowledge of $X_{final}$ may be detected by the BOX 306.

Notice that the licenser 100 may not confirm that a STB 120 has been cloned by getting authorization requests for the same (non-mobile) STB 120 from different locations, because the licenser 100 has no reason to trust the reporting devices. This is the problem of nuisance spoofing described above.

Figure 4:
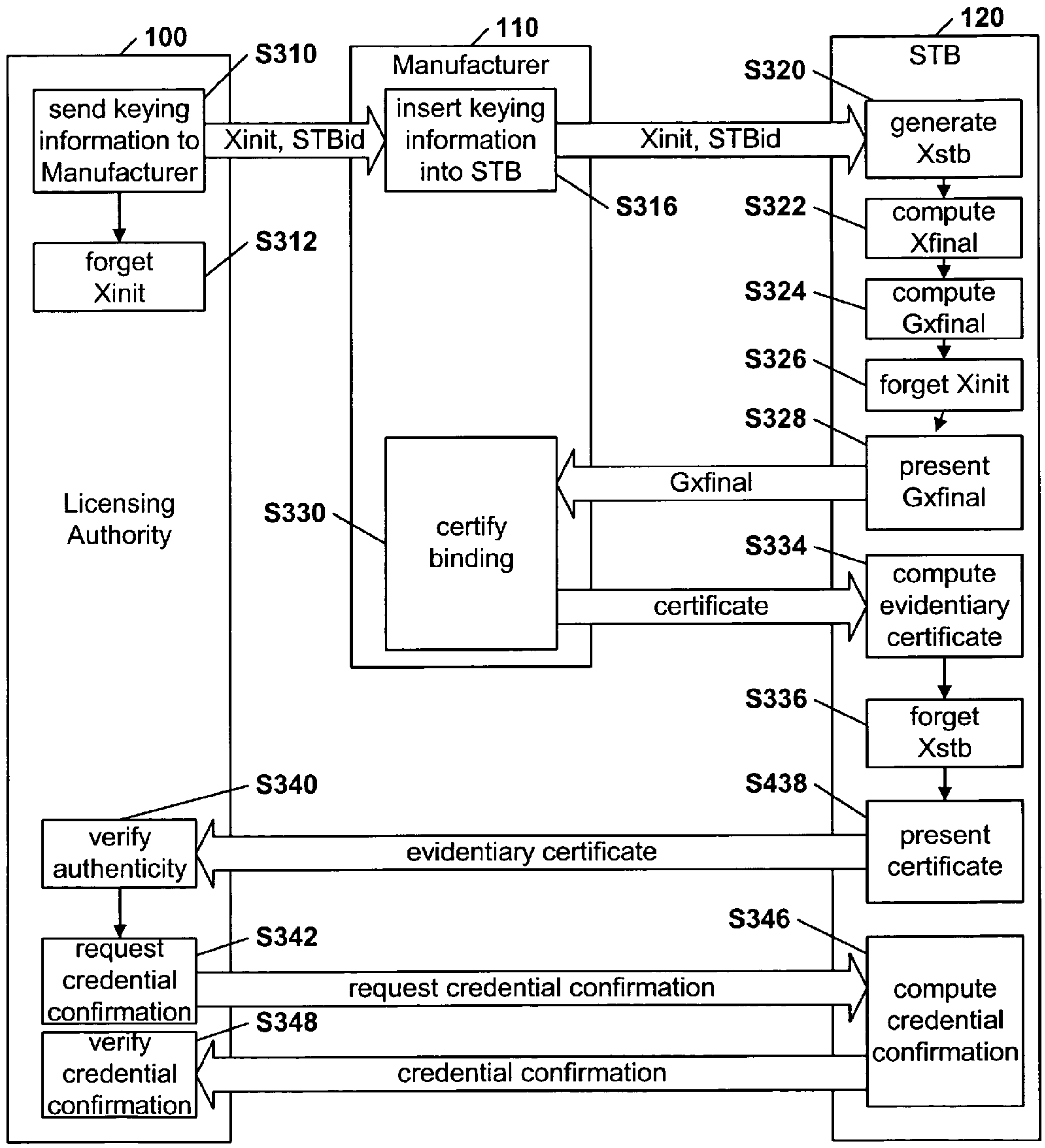
FIG. 4 is a block diagram illustrating the production of STBs database as per an aspect of an embodiment of the present invention.

It may be desirable for a STB 120 to replace its manufacturer-generated credentials with licenser credentials. For example, licenser 100 generated credentials may be more secure (e.g., the licenser protects its signature key better than manufacturers). If the STB 120 communicates directly with the licenser 100 as illustrated in FIG. 4, the STB 120 may do step S340 above and credential confirmation S342 directly with the licenser 100. (The combination proves the authenticity of the STB 120 to the licenser 100, so clones may be detected.) The licenser 100 could then present the STB 120 with licenser 100 generated credentials certifying the final public key. The STB 120 may then accept the new certificate if the public key and ID match its own, and if the certificate was generated by the licenser 100.

Notice that $X_{init}$ (initially known by the licenser 100, the manufacturer 110, and the STB 120) may have been transformed into another private key, $X_{final}$, known only to the STB 120. Yet $X_{final}$ may be provably linked to $X_{init}$.

The licenser 100 may retain the manufacturer's certificate, as proof (which can later 10 be presented, if necessary) that the manufacturer 110 was involved in the certification of the STB's public key. The licenser 100 may also opt to retain the BOX's ID if such IDs are provided within the system.

In some applications, the STB 120 may be unable to communicate directly with the licenser 100, but may communicate regularly with a device trusted highly by the licenser 100 that may infrequently or indirectly communicate with the licenser 100 (e.g., a conditional access smartcard (CAM), provided by some service provider). If the licenser 100 trusts the CAM, credential replacement may occur in a similar way, where the licenser essentially delegates the credential confirmation step to the CAM.

Compare the two-part construction of $g^{Xfinal}$ against the cases where the STB private key is designated entirely by the licenser or designated entirely on the manufacturing end, i.e., where $g^{Xfinal}$ is $g^{Xinit}$ and where $g^{Xfinal}$ is $g^{Xstb}$. In the first case, compromise of $X_{init}$ would allow undetected substitution of a pirated STB in place of a legitimate STB accomplished entirely via eavesdropping of the STB-BOX communications. We have thus sacrificed the temporally-limited usefulness aspect of compromise of $X_{init}$. (This increases the manufacturer's and licenser's liability.) In the second case, an undetected compromise of the manufacturer's private certification key would allow undetected keying of unauthorized STBs completely independently of the manufacturing process.

Note that in the prescribed two-part construction the licenser controls the quality of the randomness with respect to robustness of the final private key against cryptanalysis. The manufacturer/STB source of randomness cannot degrade the private key as long as it is independently administered. More specifically, a conscious attempt to annihilate the contribution of $X_{init}$ would have to incorporate a corresponding—$X_{init}$ (i.e., inverse) component into the choice of $X_{stb}$.

The theme here is to prevent attacks under the assumption that $X_{init}$ is kept secret. We wish to prevent successful use by an adversary of the (somehow obtained) certifying manufacturer's private key, where the adversary does not know the value of $X_{init}$: Suppose that the attacker knows $g^{Xinit}$ from the database, chooses $X_{final}$ arbitrarily, and computes the corresponding $g^{Xstb}$, as $g^{Xfinal}/g^{Xinit}$. Notice that the attacker does not know the value of $X_{stb}$ associated with this resulting value of $g^{Xstb}$, so he will not be able to compute the (argument of the) hash in the evidentiary certificate. If within the evidentiary certificate, $X_{init}$ were used in the hash instead of $X_{stb}$, then the attacker could reuse that hash itself So $X_{stb}$ should be in the hash.

Since this process allows the licenser to detect and prove that the manufacturer built unauthorized STBs, the manufacturer must be confident that it cannot be framed by the licenser. It may achieve this confidence by checking that the STBid is not a duplicate before signing the certificate binding the $g^{Xfinal}$ and the STBid. This protocol may also work without STBids. The manufacturer may, for example, retain hashes of the $X_{init}$ values it has received and check new $X_{init}$ values against these hashes for duplicates. It may be essential that the manufacturer not keep the raw $X_{init}$ values around, for then the manufacturer may be liable for their unauthorized use.

The invention provides a solution to the auditable keying of licensed devices which minimizes the need for the licenser to trust licensed manufacturers not to abuse the terms of licensing. This is due to two outcomes of the use of the solution: Non-compliance on the part of the manufacturer has been rendered less likely if the appropriate security measures are incorporated on the manufacturing line. Incidents of non-compliance are traceable to manufacturers in such a way so as to disallow plausible deniability, and therefore allow licensers to recoup losses. A positive aspect as far as the manufacturer is concerned is that because more safeguards are in place in the manufacturing process including the need for the licenser to present reasonable proof of contract abuse, the manufacturer's liability may be manageably contained.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for manufacturing a trusted device comprising the steps of:

(a) receiving keying information from a manufacturer, said manufacturer having received said keying information from a licensing authority;

(b) generating a temporary private key;

(c) computing a final private key using said temporary private key and said keying information;

(d) computing a final public key using said temporary private key and said keying information;

(e) sending said final public key to said manufacturer for certification; and (f) receiving a binding certificate from said manufacturer.

2. The method according to claim 1, wherein said keying information includes an initial private key and a device identifier.

3. The method according to claim 2, further including the step of forgetting the initial private key.

4. The method according to claim 1, further including the step of computing an evidentiary certificate.

5. The method according to claim 4, wherein said evidentiary certificate includes text and a signature of the text.

6. The method according to claim 4, further including the step of presenting a copy of said evidentiary certificate to a second device.

7. The method according to claim 4, further including the step of said second device verifying said evidentiary certificate.

8. The method according to claim 6, further including the steps of:

(a) said second device requesting a credential confirmation from said trusted device;

(b) said trusted device computing a credential confirmation; and (c) said trusted device presenting a copy of said credential certificate to said second device.

9. The method according to claim 4, further including the step of presenting a copy of said evidentiary certificate to said licensing authority.

10. The method according to claim 4, further including the step of said licensing authority verifying said evidentiary certificate.

11. The method according to claim 10, wherein said step of said licensing authority verifying said evidentiary certificate further includes the steps of:

(a) recomputing the final public key from the keying information and the evidentiary certificate; and (b) checking that the recomputed final public key with a manufacture's certificate.

12. The method according to claim 8, wherein said step of computing a credential confirmation includes using a hash function.

* * * * *